United States Patent [19]
Meyer

[11] Patent Number: 4,739,413
[45] Date of Patent: Apr. 19, 1988

[54] VIDEO-OPTIMIZED MODULATOR-DEMODULATOR WITH ADJACENT MODULATING AMPLITUDES MATCHED TO ADJACENT PIXEL GRAY VALUES

[75] Inventor: Charles S. Meyer, Nevada City, Calif.

[73] Assignee: Luma Telecom, Inc., Santa Clara, Calif.

[21] Appl. No.: 83,926

[22] Filed: Aug. 4, 1987

Related U.S. Application Data

[63] Continuation of Ser. No. 745,091, Jun. 14, 1985, abandoned.

[51] Int. Cl.$^4$ .............................................. H04N 1/40
[52] U.S. Cl. ..................................... 358/281; 358/141
[58] Field of Search ......................... 358/141, 186, 281

[56] References Cited

U.S. PATENT DOCUMENTS

| | | | |
|---|---|---|---|
| 3,152,305 | 10/1964 | Becker et al. | 375/43 |
| 3,252,094 | 5/1966 | Hughes et al. | 358/186 |
| 3,459,892 | 8/1969 | Shagena et al. | 375/43 |
| 3,517,117 | 6/1970 | Woodbury | 375/43 |
| 3,559,067 | 1/1971 | Genest et al. | 375/17 |
| 3,673,322 | 6/1972 | Baxter | 358/281 |
| 3,775,688 | 11/1973 | Hinoshita et al. | 323/218 |
| 3,849,595 | 11/1974 | Ishiguro | 358/281 |
| 3,873,771 | 3/1975 | Kleinerman et al. | 358/142 |
| 3,973,079 | 8/1975 | Fukinuki et al. | 358/281 |
| 4,415,933 | 11/1983 | Murayama et al. | 358/281 |

Primary Examiner—James J. Groody
Assistant Examiner—Randall S. Svihla
Attorney, Agent, or Firm—Townsend & Townsend

[57] ABSTRACT

A video optimized, low cost modulator-demodulator is provided. Each modulating symbol has a one-to-one correspondence with a particular pixel value of brightness. A multiple amplitude two-phase modulation method is used. The black and white values are assigned to the highest amplitude level at opposite phases. As the pixel value becomes less black or white and more gray, it is assigned lower and lower amplitude levels with its phase being determined by whether it is closer to black or to white. Errors in amplitude thus result in a pixel having an adjacent shade of gray, thus minimizing the effect of the error. Errors in phase are less likely at the higher amplitude levels, which would result in an error from black to white or vice versa. The errors in phase are more likely at lower amplitude levels, which would result in changing a mid-gray pixel to another mid-gray value. In one embodiment, each pixel value is digitized and supplied to a ROM along with the digital representation of the carrier signal. These signals combine to form an address for the ROM look-up table to select a digital representation of the modulated carrier. This is then fed to a D/A converter to produce an analog waveform for filtering and transmission. The received signal is demodulated with a phase-lock loop to recover the carrier which is then combined with the received data in a chopper demodulator. An A/D converter reconstructs the original digital data which is supplied to an image display subsystem.

9 Claims, 3 Drawing Sheets

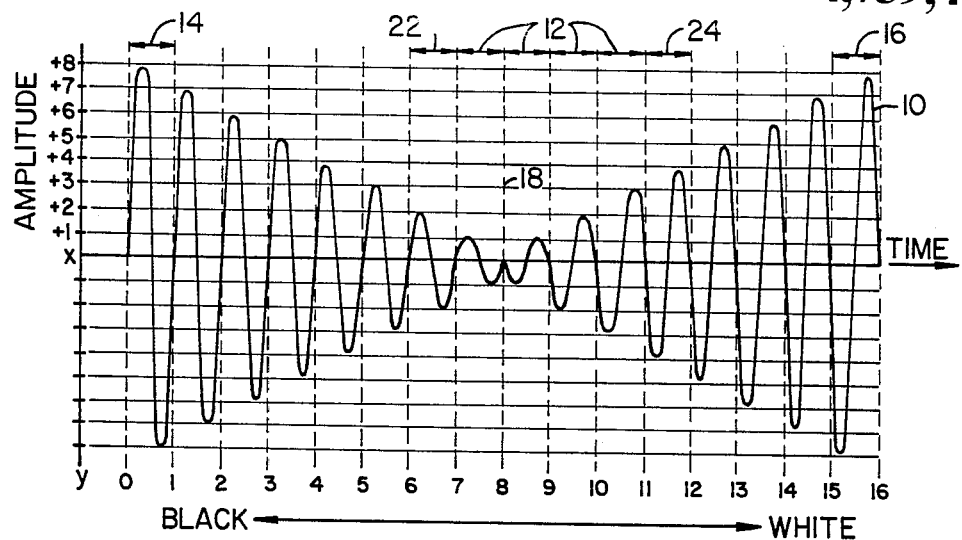
FIG._1.
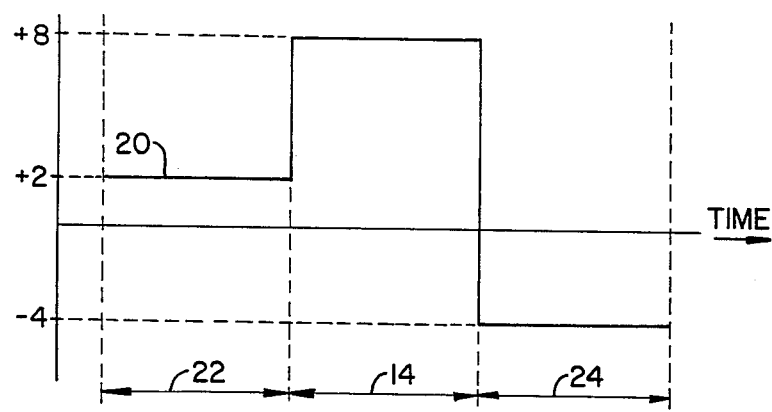
FIG._2A.
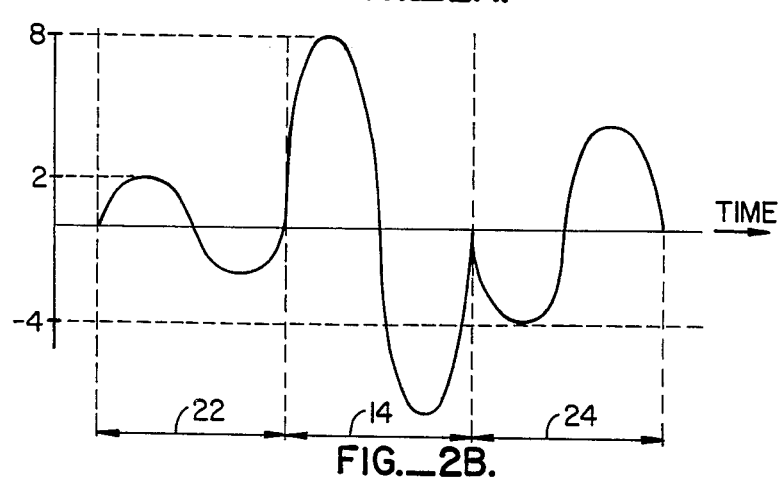
FIG._2B.

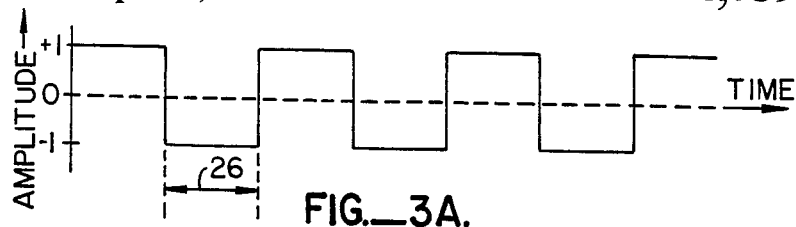
FIG._3A.
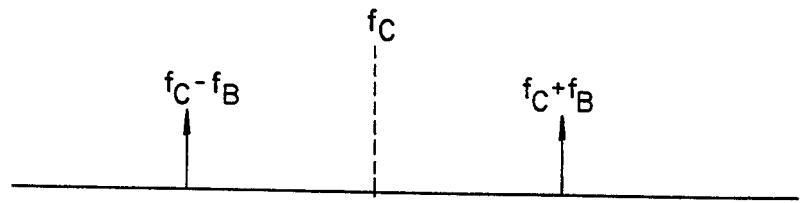
FIG._3B.
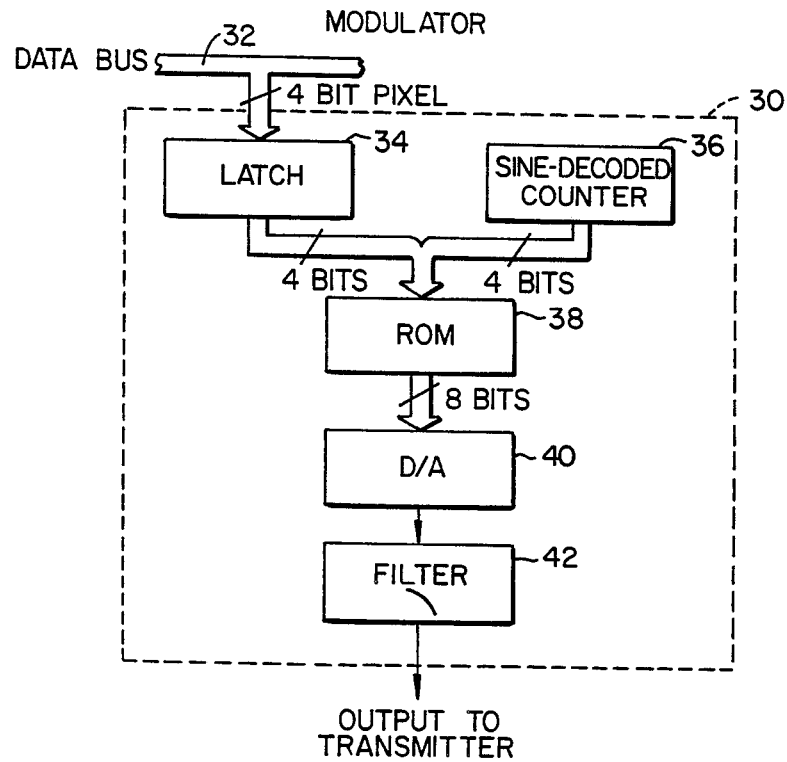
FIG._4.

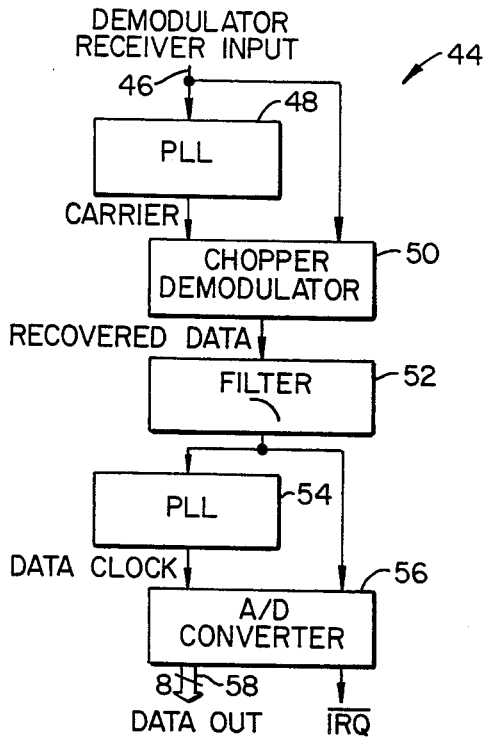
FIG._5.
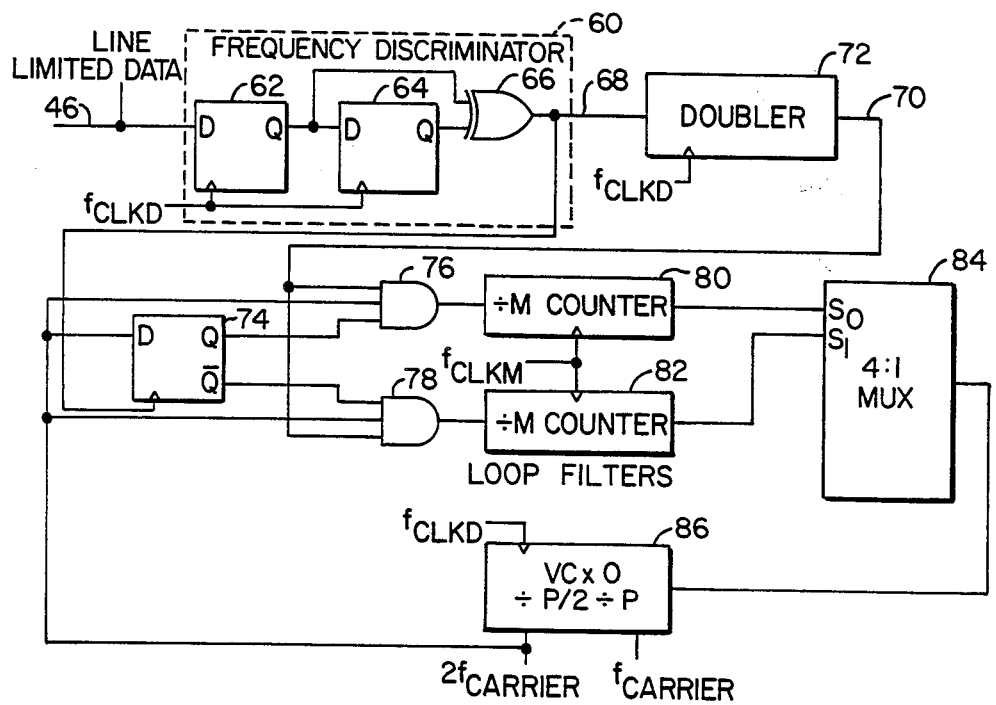
FIG._6.

VIDEO-OPTIMIZED MODULATOR-DEMODULATOR WITH ADJACENT MODULATING AMPLITUDES MATCHED TO ADJACENT PIXEL GRAY VALUES

This is a continuation of application Ser. No. 745,091, filed June 14, 1985, now abandoned.

BACKGROUND OF THE INVENTION

The present invention relates to a modulator-demodulator (modem) for video data.

A modem is commonly used to transform digital computer data into an analog form suitable for transmission over a voice grade telephone network. A carrier signal within the bandwidth of the telephone network is modulated with the digital data by one of a variety of methods. Many inexpensive modems in use today use either phase-shift keyed (PSK) modulation or frequency-shift keyed (FSK) modulation. These modems can be implemented digitally because the computer data is contained in the zero crossings of the modulated carrier signal. Thus, digital circuitry which counts and quantifies the zero crossings can be used for the demodulator. More expensive modems which use other types of modulation schemes (such as multi-level quadrature amplitude modulation (QAM)) typically require complicated and expensive filters and other components.

The basic unit of information transmitted by a modem is called a baud or a symbol. Each baud or symbol is a packet of information containing at least one binary bit. In higher bit rate modems, however, the number of bits contained in the baud or symbol is typically usually greater than one. For example, the Bell 212 modem transmits information at six hundred baud or symbols per second, but each baud or symbol contains enough information to represent two bits. Therefore, the data rate is twelve hundred bits per second.

The usable voice grade telephone network bandwidth is approximately 3400 Hz. Because of the distances involved and the varying condition and age of the components, the telephone network has various undesirable characteristics which can cause data errors during use of the telephone network as a communication link. Group delay, which is the variation in transmission time depending upon the frequency of the signal transmitted, varies from approximately 1 to 3 milliseconds across the usable bandwidth of approximately 3400 Hz. There are also frequency shifts of up to approximately 10 Hz in both positive and negative directions and other impairments, such as phase and amplitude hits, burst noise and phase jitter. All but one of these degradations results in jitter in the recovered data (amplitude hits or dropouts do not have this effect). This resultant jitter leads to inaccuracies in the recovered data clock and subsequent errors in received data. Group delay leads to another effect called inter-symbol interference (ISI) by causing amplitude information to be spread across symbol intervals. This means that the amplitude value of adjacent symbols is distorted.

For the higher data rate modems, simple PSK, FSK or QAM modulation systems are not sufficient, and multilevel schemes or vestigal side band or single side band techniques must be used. These systems become quite expensive, requiring precision narrow-band filters, sensitive phase detectors, analog multipliers and other components. In addition, as the amount of information increases, the decision threshold for symbol decoding decreases (e.g., less distance between amplitude levels). Thus, the effect of ISI becomes more and more important. Virtually all high-speed modems use some form of adaptive equalization to reduce the effects of group delay and hence ISI. However, adaptive equalization is expensive and complicated to implement.

For video data, the most familiar modulation scheme is that used for television transmission. In standard television transmission, the TV picture is composed of an array of dots or pixels. For black and white television, the pixels range in values from black through intermediate shades of gray to white. In order to transmit the TV picture, a high-frequency (MHz range) carrier signal typically has its amplitude modulated in accordance with the brightness or darkness of the individual pixels. This amplitude level is decoded by a demodulator in the television set which controls the intensity of the voltage driving the electron gun that impacts upon the phosphor at each pixel position on the television tube. This analog modulation system requires a high-frequency bandwidth because of the abrupt changes in amplitude, especially in changes from black to white. These abrupt amplitude changes, when used to modulate the carrier, introduce high-frequency components into the signal, thus requiring a large bandwidth for transmission.

For digital video or facsimile transmission, the brightness of each pixel is transformed into a digital value. Typically, 8-10 bits are used for video (i.e., 256 to 1024 values) and one bit is used for facsimile (black and white). One specific example would be where sixteen values are used representing a range of brightness from white through fourteen intermediate shades of gray to black. These sixteen values require a minimum of four bits to represent each value. The digital bit stream can then be supplied to a modem which is used for digital data.

The hostile environment of the telephone network makes it difficult to use higher data rates for video data without experiencing severe degradation of picture quality due to errors. For instance, the intersymbol interference of the telephone network can have the effect of changing one bit of each four-bit word representing a pixel. This change of one bit value can result in a large change in the decoded value of the pixel, such as a change from black to white. Such an error would cause white dots to appear in an area of the picture which should be black, or vice-versa.

SUMMARY OF THE INVENTION

The present invention provides a low-cost digital modulator-demodulator optimized for video data, wherein each modulated state or symbol (amplitude, phase, frequency or a combination thereof) has a one-to-one correspondence with a particular pixel value of brightness. Adjacent shades of gray for the pixels are assigned to adjacent amplitude, phase or frequency values. An error in any value is most likely to result in the value being interpreted as an adjacent value. Thus, any error in transmission results in a pixel having its shade changed only slightly. Because approximately 50% of adjacent pixels in the typical video image of a person's face, for instance, are identical and approximately 80% are within one gray shade of each other, the degradation from an error of one or two shades is minimal. Consequently, the modem in accordance with the invention is particularly advantageous for communication of a video image of a person's face over a telephone network.

Preferably, the present invention uses a multiple amplitude, two-phase modulation method. This modulation technique can also be described as dual sideband, suppressed carrier amplitude modulation. The black and white values are assigned to the highest amplitude level at opposite phases. As the pixel value becomes less black or white and more gray, it is assigned lower and lower amplitude levels with its phase being determined by whether it is closer to black or to white. The intermediate shades of gray have the lowest amplitude levels. Thus, the pixel values which would produce the most noticeable errors if incorrect (the black and white values), are assigned the highest amplitude levels which are least likely to result in error. Because only two phases are used, a phase error is highly unlikely to result in a change from white to black. This encoding scheme is contrary to the standard practice of assigning the most prevalent data, i.e., the grays, to the most error-insensitive states.

The use of only two phases along with the multiple amplitude levels allows the use of a reduced bandwidth for transmission. Since adjacent amplitude levels are typically of the same phase, there are fewer phase changes to result in added frequency components for the transmitted signal.

In the modulator stage of the modem in accordance with the present invention, a digital pixel value arriving via a data bus from the image capture (camera) subsystem is supplied to a ROM (read-only-memory) along with a digital representation of the carrier signal from a counter. These signals combine to form an address for the ROM look-up table to select data which provides proper values to represent the desired level. The ROM output is a digital representation of the modulated carrier which is fed through a D/A (digital-to-analog) converter to produce an analog waveform, which is then filtered and transmitted. In the demodulator, a phase-lock loop is used to recover the carrier. The carrier is then combined with the received data in a chopper demodulator to extract the data in analog form. A second phase-lock loop is then used to recover the data clock. Finally, an A/D (analog-to-digital) converter is used to reconstruct the digital data which is supplied to the image display subsystem.

The present invention allows an inexpensive digital modem to operate at a higher data rate than normally possible due to the tolerance to errors of the video image information provided by the novel encoding scheme of the present invention. Data rates of 7000 bits per second are possible, compared to the 1200 bits per second possible for the common commercially available high-speed digital modems. The present invention thus optimizes the performance of a modulator-demodulator for video data. The present invention could also be used with analog modems and data other than video image data could be transmitted.

BRIEF DESCRIPTION OF THE DRAWINGS

FIG. 1 is a diagrammatic representation of the encoding scheme of the present invention.

FIG. 2A is a schematic representation of the modulating data of the present invention.

FIG. 2B is a schematic representation of the modulated carrier of the present invention.

FIG. 3A is a schematic representation of the fastest changing signal possible for the video data.

FIG. 3B is a schematic representation of the bandwidth of the data frequency components of the present invention.

FIG. 4 is a block diagram of a preferred embodiment of the modulator of the present invention.

FIG. 5 is a block diagram of a preferred embodiment of the demodulator of the present invention.

FIG. 6 is a block diagram of the phase-lock loop shown in FIG. 5.

DETAILED DESCRIPTION OF THE PREFERRED EMBODIMENT

FIG. 1 is a schematic representation of the modulation or encoding scheme of the present invention. FIG. 1 shows a modulated carrier signal 10 extending for sixteen baud or symbol intervals 12 as modulated by sixteen different pixel values. The sixteen symbol intervals correspond to black, fourteen intermediate shades of gray, and white. The values progress from black to white along the X axis, with the Y axis showing the amplitude of the modulated carrier signal. Interval 14 shows a cycle of the carrier representing a black pixel having the highest amplitude at a first phase. An interval 16 shows a cycle of the carrier symbol representing a white pixel having amplitude equal to that of interval 14 at an opposite phase. The fourteen intermediate symbols represent the shades of gray between black and white. At the midpoint 18 of the spectrum from black to white, the phase of the signal 10 changes 180°.

Each of the sixteen pixel values to be transmitted is converted to a four-bit digital value. The sixteen four-bit numbers are then converted to eight amplitude levels of opposite signs. The positive sign represents 0° phase change for black and the shades of gray closest to black. The negative sign represents 180° phase change for white and the shades of gray closest to white. FIG. 2A shows an example of data signal 20 for three pixels in a pictorial representation. A first pixel for an intermediate gray is represented by the value +2 in a pixel interval 22. A second pixel interval 14 has a positive amplitude of +8 corresponding to black, and a third pixel interval 24 has a negative amplitude of −4 corresponding to one of the lighter shades of gray. The location in the group of the pixel shades represented in intervals 22, 14 and 24 can be seen in FIG. 1.

By multiplying signal 20 by the carrier frequency, the corresponding modulated carrier frequency shown in FIG. 2B is produced. It can be seen that the amplitude of the carrier signal is varied in accordance with the amplitude of the pixel value, and that the phase of the carrier signal is reversed on the positive-to-negative transition from interval 14 to interval 24. Because each phase change is 180°, it is less likely that an error will occur than in a system using a larger number of phase changes. Any error in amplitude simply results in a small variation of the shade of the pixel affected. For instance, if the amplitude level 1 at 0° phase is erroneously decoded as an amplitude level 2, the result is a pixel which is off by one shade of gray. By putting the black and white pixels at opposite phases, the likelihood of a white pixel being decoded as black, or vice-versa, is highly unlikely.

Inter-symbol interference can cause some error in amplitude due to the multiple levels used, but is less likely to cause an error in phase because there is a wider margin for error in the phase since only two phases are used. For video images of a person's face, adjacent pixels are identical approximately 50% of the time and are within one shade approximately 80% of the time. Any degradation of picture quality is soft, and the human eye easily compensates for such soft errors.

The encoding method described above also reduces the effective bandwidth required for transmission. The harmonic frequency content of a signal, which increases with the number of abrupt changes in the signal, determines the bandwidth required for transmission. In the typical video image, adjacent pixels typically vary only slightly in shade, as discussed above. Thus, referring to FIG. 1, it can be seen that the change in the modulated carrier signal from pixel to pixel is typically only a change in amplitude, not a change in phase. Since few phase changes are present, the harmonic content of the signal is low.

To implement the above modulation method, a carrier frequency and baud rate (symbols or intervals per second) must be selected. The maximum usable bandwidth of a telephone network is approximately 3400–3500 Hz. The theoretical maximum bit rate for this bandwidth can be determined using the Hartley-Shannon theorem of equation 1 below:

$$C = B*\log_2(1 + S/N) \quad \text{eq. 1}$$

where $C$ = bit rate $B$ = channel frequency bandwidth $S/N$ = the RMS signal-to-noise ratio in the channel Using B=3500 Hz for the phone channel bandwidth and S/N=15 dB for the signal-to-noise ratio yields C=14,600 bits as the maximum theoretical bit rate. 15 dB is a level of noise which significantly degrades voice communication and thus is a reasonable maximum level to choose. Since the encoding method of the invention uses one pixel per baud or symbol and it takes 4 bits to represent each pixel, the maximum theoretical bit rate of 14,600 bits corresponds to a maximum theoretical baud rate of 14,600/4=3650 baud.

In practice, analyzing the bandwidth rate independent of the bit rate, the maximum baud rate, or number of symbols per second, is equal to the bandwidth used for transmission for random data with a uniform distribution. This can be seen by referring to FIGS. 3A and 3B. The maximum base band frequency, or maximum frequency of the modulating data, occurs when the data assumes alternate black and white states causing the sign of the signal to change from one symbol to the next, resulting in a square wave as shown in FIG. 3A. Interval 26 represents one baud or symbol. If the signal changes from the maximum negative amplitude to maximum positive amplitude in every interval, a periodic signal results having a period equal to two baud intervals. Thus, the maximum frequency is the inverse of the period (2 baud) which is one-half the baud rate.

When this maximum base band frequency is applied to the carrier frequency, $f_C$, the resultant modulated signal has first sidebands at the carrier frequency $f_c$ minus the base band frequency $f_B$ and at the carrier frequency $f_C$ plus the base band frequency $f_B$, as shown in FIG. 3B. The bandwidth necessary to include both of the sidebands is $2f_B$ which equals 2(baud rate/2)=baud rate. Because most of the harmonic content (and thus most of the energy) of the modulated signal is in the first sidebands, the signal can be decoded without additional sidebands. Thus, a bandwidth which only includes the first sidebands is sufficient to recover the maximum base band frequency. Any other arbitrary combination of data produces a waveform which can be thought of as being periodic at a lower frequency than the maximum base band frequency. The first sidebands (fundamental harmonic) of such frequencies fall within the sidebands of the maximum base band frequency. Thus, a bandwidth equal to the baud rate is sufficient to transmit any arbitrary combination of data.

The usable telephone network bandwidth is approximately 3400 Hz, but both the high and low-frequency portions of the phone channel suffer from severe group delay distortions. Thus, although a baud rate of approximately the usable bandwidth is possible, it is desirable to only use the center of the telephone channel and a baud rate of approximately one-half of the bandwidth. A carrier frequency of 1747.8 Hz can be obtained by using a standard color TV 3.579545 MHz crystal oscillator and dividing by 2048, which is easily obtainable with digital circuitry because 2048 is a power of two number. This carrier frequency is approximately in the middle of the telephone channel. By using a baud rate equal to the carrier frequency, the carrier bandwidth occupies only the center half of the telephone channel, which is least susceptible to group delay. The bit rate achieved is 4×1747.8=6991.3 bits per second.

FIG. 4 shows a modulator 30 of the present invention. A four-bit digital representation of each pixel arrives via data bus 32 from an image-capture system (not shown). The pixel value is latched into a latch 34. A sine counter 36, which runs at sixteen times the carrier frequency, generates four output bits which are decoded into a sixteen-level approximation to the carrier sinewave. The four pixel bits from latch 34 and the four sinewave bits from counter 36 are decoded in ROM 38 to produce an eight-bit digital value which corresponds to the product of the pixel value and the sinewave value, giving a digital representation of the modulated carrier. This eight-bit digital representation is converted in a D/A converter 40 into an analog waveform. The analog waveform is passed through a low-pass filter 42 to remove undesirable high-frequency components. The output of filter 42 is sent to the transmitter (not shown) for transmission.

FIG. 5 shows a demodulator 44 of the present invention. The incoming signal from a duplexer (not shown) is limited (line-limited signal) and applied to an input 46 and fed to a phase-lock loop 48. Phase-lock loop 48 is used to recover the carrier which is then input to a chopper demodulator 50 along with the original received signal from input 46. The output of chopper demodulator 50 is the recovered data in analog form. This data is passed through a low-pass filter 52 to remove unwanted high-frequency components. Filter 52 is preferably an eighth-order Butterworth-Bessel transitional filter having a scaling factor of ½. A second phase-lock loop 54 is used to recover the data clock from the recovered data. The data clock and recovered analog data are then fed to an A/D converter 56 to reconstruct the eight-bit digital data at an output 58. The digital data from output 58 is then fed to a microprocessor (not shown) to be converted into the appropriate pixel value for reconstruction of the image.

Phase-lock loop 48 is shown in more detail in FIG. 6. The line-limited input data 46 is passed through a frequency discriminator 60 comprised of two D flip-flops 62,64 and an exclusive OR gate 66. Flip-flops 62 and 64 are clocked by a clock signal $f_{CLKD}$. The output 68 of discriminator 60 is then used to generate a doubled frequency output 70 via a programmable counter 72 which is clocked by the clock signal $f_{CKLD}$. Discriminator output 68 is used as the clock for a D flip-flop 74. The eventually recovered carrier frequency, after doubling, is fed back as the input to flip-flop 74. The outputs of flip-flop 74, along with the doubled recovered carrier frequency and doubled frequency output 70, are used as inputs to two AND gates 76,78. A pulse proportional to the magnitude of the phase error of the doubled frequency is generated by the two AND gates 76,78. The outputs of AND gates 76,78 drive counters 80,82, respectively, which are used to quantify and scale the error. Counters 80,82 are clocked by a clock signal $f_{CLKM}$. Since the error is scaled, it is also delayed in time. This is analogous to performing a discrete time integration. Therefore, each counter 80,82 also serves as a loop filter. The output of each counter 80,82 is then used to control a multiplexer 84 whose output has one of three values: high, low, or one cycle of half-high and half-low. This signal is used to control a last counter 86 which generates both the recovered carrier and twice the recovered carrier. This last counter 86 is essentially a voltage controlled crystal oscillator (VCXO).

When the input error is zero, the output of multiplexer 84 is the half-high, half-low signal. this causes the output of counter 86 to be a nominal 1747.8 Hz square wave. However, frequency shift in the telephone network and frequency differences between systems will lead to shifts in the received carrier. When the error is negative, the output of multiplexer 84 is high and counter 86 will count one extra clock, thus momentarily increasing the frequency and advancing the phase. If the error is low, the control signal output of multiplexer 84 is low. This prevents counter 86 from counting for one clock and thus instantaneously decreases the frequency, hence retarding the phase.

Using the recovered carrier, the received signal is passed through the balanced, chopper demodulator 50 and low-pass filtered in filter 52 to recover the base band data as shown in FIG. 5. This signal is then hard-limited once more and passed through the other phase-lock loop 54 identical to phase-lock loop 48 except for the addition of a divider following the VCXO 86. The output of this divider, which is a square wave at the data clock rate, is then used to generate a pulse which strobes A/D converter 56, thus sampling the recovered data waveform and generating an interrupt IRQ to a microprocessor (not shown) telling it to read the new data value. The microprocessor then takes that value and converts it into the correct pixel value which is used to generate a part of the picture.

As will be understood by those familiar with the art, the present invention may be embodied in other specific forms without departing from the spirit or essential characteristics thereof. For instance, a spectrum of color values could be used rather than black and white. Accordingly, the disclosure of the preferred embodiment of the invention is intended to be illustrative, but not limiting, of the invention, the scope of which is set forth in the following claims.

What is claimed is:

1. An apparatus for transmitting symbols representing pixels of a pictorial representation, each said pixel having one of a plurality of values, comprising:
   means for providing a digital representation of a pixel value;
   clock means for producing a counting signal;
   look-up table means for storing a plurality of digital representations of symbols, each symbol being a single cycle of a sine wave having one of at least two phases and one of a plurality of non-zero amplitude levels, said look-up table means providing, in response to said digital representation of a pixel value and said counting signal, one of said digital representations of said symbols such that adjacent pixel values from a first extreme value to a first mid-value are assigned to symbols having adjacent amplitude levels from a high to a low level with a first phase and adjacent pixel values from a second extreme value to a second mid-value are assigned to symbols having adjacent amplitude levels from said high to said low level with a second phase; and
   a digital-to-analog converter coupled to said look-up table means for converting said one of said digital representations of said symbols provided by said look-up table means into the corresponding one of said symbols.

2. The apparatus of claim 1 further comprising means for receiving and decoding a symbol to recreate the digital representation of the corresponding pixel value, said means for receiving and decoding including:
   a first phase-lock loop for providing a carrier signal corresponding to the frequency of said sine wave;
   a demodulator coupled to said first phase-lock loop;
   a filter coupled to said demodulator;
   a second phase-lock loop coupled to said filter for producing a clock signal; and
   an analog-to-digital converter coupled to said filter and said second phase-lock loop for recreating the digital representation of the corresponding pixel value when clocked by said clock signal.

3. The apparatus of claim 1 wherein said pixel values correspond to shades of gray, said first extreme value corresponding to white and said second extreme value corresponding to black.

4. The apparatus of claim 1 wherein said low level has a value of at least the difference between adjacent ones of said amplitude levels.

5. The apparatus of claim 1 wherein said look-up table means is a read-only memory.

6. The apparatus of claim 1 wherein said sine wave has a frequency near the midpoint of the bandwidth of a voice-grade telephone channel.

7. The apparatus of claim 1 wherein said clock means is a sine counter which generates a plurality of digital representations of instantaneous values of said sine wave for each cycle of said sine wave.

8. An apparatus comprising means for transmitting symbols representing pixels of a pictorial representation, each said pixel having one of a plurality of values, said means for transmitting including:
   means for providing a digital representation of a pixel value;
   clock means for producing a counting signal;
   look-up table means for storing a plurality of digital representations of symbols, each symbol being a single cycle of a sine wave having one of at least two phases and one of a plurality of non-zero amplitude levels, said look-up table means providing, in response to said digital representation of a pixel value and said counting signal, one of said digital representations of said symbols such that adjacent pixel values from a first extreme value to a first mid-value are assigned to symbols having adjacent amplitude levels from a high to a low level with a first phase and adjacent pixel values from a second extreme value to a second mid-value are assigned to symbols having adjacent amplitude levels from said high to said low level with a second phase, said low level having a value of at least the difference between adjacent ones of said amplitude levels; and a digital-to-analog converter coupled to said look-up table means for converting said one of said digital representations of said symbols provided by said look-up table means into the corresponding one of said symbols;

said apparatus further comprising means for receiving and decoding a symbol to recreate the digital representation of the corresponding pixel value, said means for receiving and decoding including:

a first phase-lock loop for providing a carrier signal corresponding to the frequency of said sine wave;

a demodulator coupled to said first phase-lock loop;

a filter coupled to said demodulator;

a second phase-lock loop coupled to said filter for producing a clock signal; and an analog-to-digital converter coupled to said filter and said second phase-lock loop for recreating the digital representation of the corresponding pixel value when clocked by said clock signal.

9. An apparatus comprising means for transmitting symbols representing pixels of a pictorial representation, each said pixel having one of a plurality of values, said means for transmitting including:

means for providing a digital representation of a pixel value;

a sine counter for generating a plurality of digital representations of instantaneous values of a sine wave for each cycle of said sine wave;

look-up table means for storing a plurality of digital representations of symbols, each symbol being a single cycle of said sine wave having one of at least two phases and one of a plurality of non-zero amplitude levels, said look-up table means providing, in response to said digital representation of a pixel value and an output of said sine counter, one of said digital representations of said symbols such that adjacent pixel values from a first extreme value to a first mid-value are assigned to symbols having adjacent amplitude levels from a high to a low level with a first phase and adjacent pixel values from a second extreme value to a second mid-value are assigned to symbols having adjacent amplitude levels from said high to said low level with a second phase, said low level having a value of at least the difference between adjacent ones of said amplitude levels, said pixel values corresponding to shades of gray, said first extreme value corresponding to white and said second extreme value corresponding to black; and a digital-to-analog converter coupled to said look-up table means for converting said one of said digital representations of said symbols provided by said look-up table means into the corresponding one of said symbols;

said apparatus further comprising means for receiving and decoding a symbol to recreate the digital representation of the corresponding pixel value, said means for receiving and decoding including:

a first phase-lock loop for providing a carrier signal corresponding to the frequency of said sine wave;

a demodulator coupled to said first phase-lock loop;

a filter coupled to said demodulator;

a second phase-lock loop coupled to said filter for producing a clock signal; and an analog-to-digital converter coupled to said filter and said second phase-lock loop for recreating the digital representation of the corresponding pixel value when clocked by said clock signal.

* * * * *